Feb. 18, 1930.  J. F. DARLING  1,747,890
VERTICALLY ASCENDING AND DESCENDING AEROPLANE
Filed Oct. 12, 1929
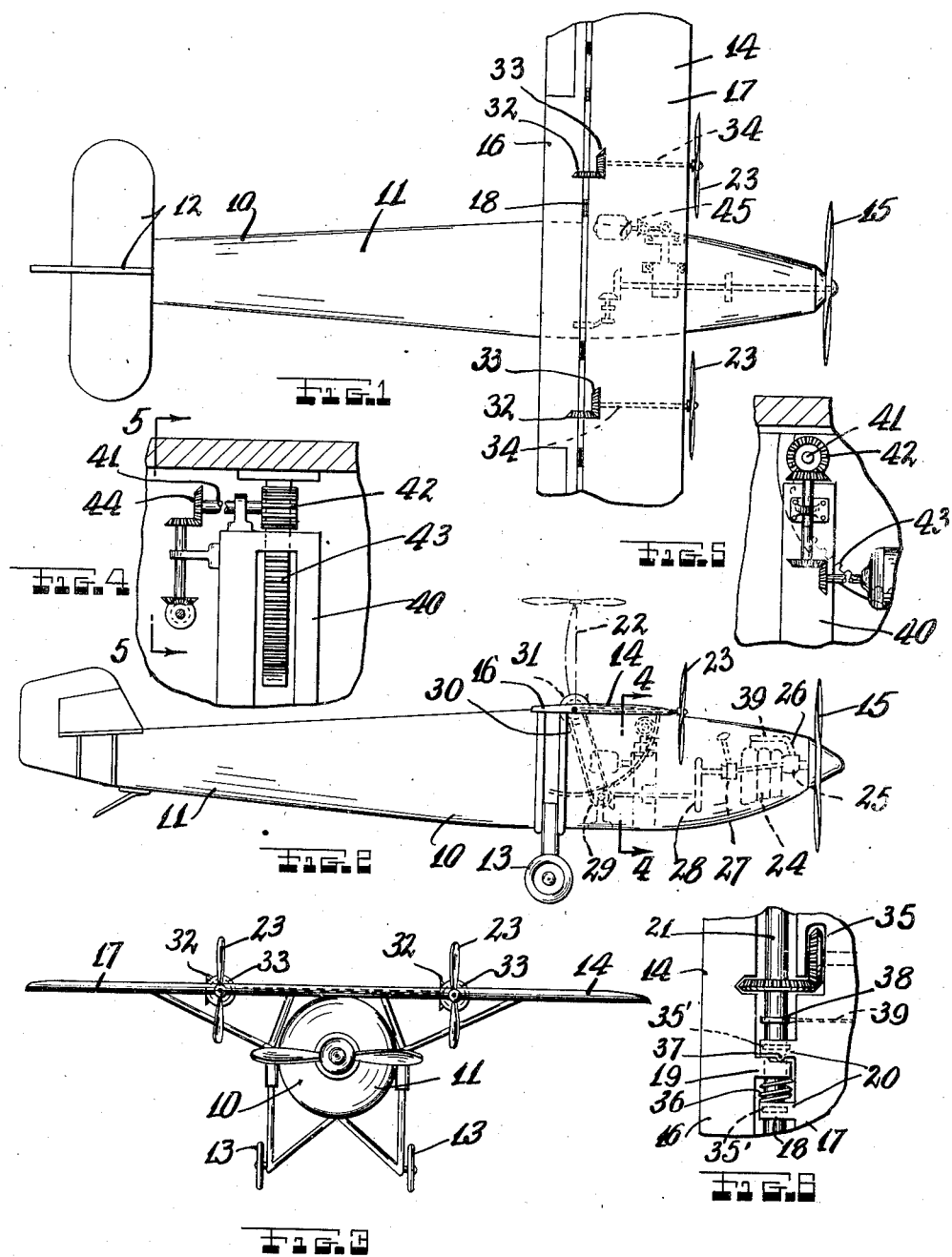
INVENTOR.
John Franklin Darling
BY
ATTORNEY Patented Feb. 18, 1930

1,747,890

UNITED STATES PATENT OFFICE

JOHN FRANKLIN DARLING, OF GARDEN CITY, NEW YORK

VERTICALLY ASCENDING AND DESCENDING AEROPLANE

Application filed October 12, 1929. Serial No. 399,121.

This invention relates to new and useful improvements in a flying machine.

This invention has for an object the provision of a device of the class mentioned which is of simple durable construction, dependable in use and efficient in action, and which can be manufactured and sold at a reasonable cost.

The invention proposes a flying machine having a tractor propeller and a wing or wings constructed in sections, certain of which are stationary and the others pivotally connected with the stationary sections and arranged for moving from the horizontal to the vertical position, a combination tractor and helicopter propeller or propellers rotatively mounted on each movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable section from the horizontal to the vertical, and means for moving the movable wing sections from the horizontal to the vertical.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a fragmentary plan view of a flying machine constructed according to this invention.

Fig. 2 is a side elevational view of Fig. 1.

Fig. 3 is an end elevational view of Fig. 2.

Fig. 4 is an enlarged fragmentary sectional view taken on the line 4—4 of Fig. 2.

Fig. 5 is a sectional view taken on the line 5—5 of Fig. 4.

Fig. 6 is a fragmentary enlarged detailed view of a portion of Fig. 1.

The flying machine 10 constructed according to this invention is of any design or construction and has a body 11, tail wings 12, a landing gear 13, a main wing 14, and a tractor propeller 15. The main wing 14 consists of a stationary section 16 and a movable section 17 hingedly connected therewith at 18. The hinge connection is accomplished by a lug 19 projecting from the stationary section 16 and other lugs 20 projecting from the movable section 17, and a pintle shaft 21 engaging thru the lugs.

The movable section 17 is capable of moving from the horizontal position as shown in full lines on the drawing to the vertical position indicated by dot and dash lines 22 in Fig. 2. Combination tractor and helicopter propellers 23 are rotatively mounted upon the movable section 17 and arranged so as to rotate in a plane at right angles to the plane of the section irrespective of the position of the latter element. When rotating in a vertical plane, these propellers act as tractor propellers while when the movable section assumes its vertical position and the propellers rotate in the horizontal, they act as helicopters.

A means is provided for rotating the tractor propeller and consists of a motor 24 mounted within the body of the plane and connected with the propellers, but a clutch 25 being interposed between the connection. This clutch has an operating handle 26. A means is also provided for rotating the combination tractor and helicopter propellers and this means consists of the same motor 24 connected with a clutch 27 and thereafter with a system of gears 28 terminating in a sprocket wheel 29. A chain 30 engages over the sprocket wheel 29 and connects with another sprocket wheel 31 fixed upon the pintle shaft 21. The pintle shaft is capable of rotating without interfering with the pivotal position of the movable section 17.

The means for rotating the combination propellers also consists of bevel gears 32 fixed upon the pintle shaft 21 and meshing with other bevel gears 33 fixed upon shafts 34 carrying the said propellers 23. Preferably the shafts 34 should be embedded in the wing section 17 and the gears 33 should project from cut-out portions 35 in the wing section.

A means is also provided for automatically discontinuing rotation of the tractor propeller 15 during motion of the movable wing section 17 from the horizontal to the vertical. This means consists of thrust flanges 35' in the lugs 20 on the movable wing section and engaging in thrust bearings in these lugs. An expansion spring 36 is coaxially arranged upon the pintle shaft 21 and acts between one of the lugs on the movable wing section and the lug on the stationary wing section for urging one of the lugs on the movable wing section against the lug on the stationary section. The adjacent faces of the contacting lugs are formed with cam elements 37 arranged to move the movable section 17 laterally when it moves from the horizontal to the vertical. A collar 38 is fixed upon the pintle shaft 21 and connects with an arm 39 connected with the clutch control lever 26.

A means is provided for moving the movable wing section 17 from the horizontal to the vertical and consists of a stationary support 40 secured upon the aeroplane body and supporting a rotative shaft 41 provided with a pinion 42 meshing with an arcuate rack 43 attached upon the movable section 17 and of a curvature so that its center of curvature coincides with the pivotal point of the hinged section. A system of gears 44 connect with the shaft 41 and with a motor 45.

In operation of the device, and assuming the flying machine before flight, the motor 45 is energized for moving the pivotal wing section 17 from the horizontal to the vertical. In this condition the clutch 25 is disengaged. Clutch 27 is now engaged and rotations from the motor 24 are transmitted to the combination propellers 23. The helicopter action is depended upon to raise the machine. After a sufficient height has been reached, the motor 45 is again energized, this time for moving the section 17 from the vertical to the horizontal.

During the major portion of the moving of the wing section 17 from the vertical to the horizontal position, the clutch 25 remains disengaged but after the movable wing section 17 has assumed substantially a horizontal position, the cams 37 are in such position that the spring 36 is free to move the wing section 17 slightly laterally, which motion is communicated to the arm 39 and clutch 25 for engaging the clutch and transmitting rotations from the motor to the tractor propeller 15 also.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a flying machine, a tractor propeller, and a wing construction in sections, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable wing section from the horizontal to the vertical, and means for moving the movable wing section from the horizontal to the vertical.

2. In a flying machine, a tractor propeller, and a wing construction in sections, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable wing section from the horizontal to the vertical, and means for moving the movable wing section from the horizontal to the vertical, said means for rotating the tractor propeller consisting of a motor connected therewith, and a clutch interposed between the connection.

3. In a flying machine, a tractor propeller, and a wing constructed in sections, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable wing section from the horizontal to the vertical, and means for moving the movable wing section from the horizontal to the vertical, said means for rotating the combination tractor and helicopter propeller consisting of a motor, a clutch connected therewith, a gear system connected with the clutch and terminating in a sprocket wheel, a sprocket wheel fixed upon a shaft coaxial with the hinge center of the pivoted section and constituting the pintle, a chain connecting said sprockets, a bevel gear fixed upon the shaft and meshing with another bevel gear fixed upon a shaft supporting the said combination propeller.

4. In a flying machine, a tractor propeller, and a wing constructed in sections, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable wing section from the horizontal to the vertical, and means for moving the movable wing section from the horizontal to the vertical, said means for rotating the combination tractor and helicopter propeller consisting of a motor, a clutch connected therewith, a gear system connected with the clutch and terminating in a sprocket wheel, a sprocket wheel fixed upon a shaft coaxial with the hinge center of the pivoted section and constituting the pintle, a chain connecting said sprockets, a bevel gear fixed upon the shaft and meshing with another bevel gear fixed upon a shaft supporting the said combination propeller, the means for automatically discontinuing rotation of the tractor propeller during motion of the movable wing section from the horizontal to the vertical, comprising a means for slightly moving the movable section laterally during its motion from the horizontal to the vertical, and an arm communicating the lateral motion to the clutch of the tractor propeller.

5. In a flying machine, a tractor propeller, and a wing constructed in section, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable wing section from the horizontal to the vertical, and means for moving the movable wing section from the horizontal to the vertical, said means for rotating the combination tractor and helicopter propeller consisting of a motor, a clutch connected therewith, a gear system connected with the clutch and terminating in a sprocket wheel, a sprocket wheel fixed upon a shaft coaxial with the hinge center of the pivoted section and constituting the pintle, a chain connecting said sprockets, a bevel gear fixed upon the shaft and meshing with another bevel gear fixed upon a shaft supporting the said combination propeller, the means for automatically discontinuing rotation of the tractor propeller during motion of the movable wing section from the horizontal to the vertical, comprising a means for slightly moving the movable section laterally during its motion from the horizontal to the vertical, and an arm communicating the lateral motion to the clutch of the tractor propeller, said means for moving the wing section slightly laterally consisting of cam elements arranged upon lugs constituting the pivotal connection of the section.

6. In a flying machine, a tractor propeller, and a wing constructed in sections, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and helicopter propeller, means for automatically discontinuing rotation of the tractor propeller during motion of the movable wing section from the horizontal to the vertical, and means for moving the movable wing section from the horizontal to the vertical, comprising a stationary support, a shaft rotative thereon, a pinion fixed on the shaft and meshing with an arcuate rack fixed upon the movable wing section and having its center of curvature coinciding with the pivotal point of the wing section, a system of gears connected with said shaft, and a motor connected with the gears.

7. In a flying machine, a tractor propeller, and a wing constructed in sections, one of which is stationary and the other pivotally connected with the stationary section and arranged for moving from the horizontal to the vertical position, a combination tractor and helicopter propeller rotatively mounted on the movable section so as to rotate in a plane at right angles to the plane of the section irrespective of the position of the latter element, means for rotating the tractor propeller, means for rotating the combination tractor and heilcopter propeller, means for automatically discontinuing rotation of the tractor propeller during motion of the movable wing section from the horizontal to the vertical, and means for moving the movable wing section from the horizontal to the vertical, comprising an arcuate rack attached upon the movable wing section and having its center of curvature coinciding with the pivotal point of the wing section, a pinion meshing with the rack, and means for rotating the pinion.

In testimony whereof I have affixed my signature.

JOHN FRANKLIN DARLING.